United States Patent Office 3,574,782
Patented Apr. 13, 1971

3,574,782
PROCESS FOR PRODUCING LINEAR ALPHA OLEFINS
Roby Bearden, Jr., Baton Rouge, and Neville L. Cull, Baker, La., assignors to Esso Research and Engineering Company
No Drawing. Filed Oct. 16, 1967, Ser. No. 675,335
Int. Cl. C07c 3/18
U.S. Cl. 260—683.15          7 Claims

ABSTRACT OF THE DISCLOSURE

A process for preparing linear alpha olefins having an average molecular weight ranging from about 70 to about 300 by polymerizing an ethylene containing gas in the presence of a homogeneous catalyst formed upon reacting a transition metal halide selected from the group consisting of $TiX_4$, $TiX_3OR'$ and $TiX_3OOCR'$ wherein X is selected from the group consisting of chlorine and bromine and R' is selected from the group consisting of alkyl, allyl, aralkyl and cycloalkyl with an aluminum alkyl halide compound characterized by the formula $AlR_nX_{3-n}$ wherein R is selected from the group consisting of alkyl, aralkyl and cycloalkyl, X is selected from the group consisting of chlorine, bromine and iodine and $n$ is less than 2, along with from 5% to about 50 mol percent based on the moles of transition metal halide present in the catalytic mixture of a modifier characterized by the formula

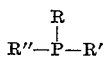

wherein P is phosphorus and R, R' and R" being the same or different are selected from the group consisting of hydrogen, alkyl, cycloalkyl and alkoxy containing from 1 to 20 carbon atoms, in the presence of a polar diluent selected from the group consisting of aromatic, halogenated aromatic and halogenated aliphatic compounds at a temperature below 75° C. at a pressure sufficient to liquefy the ethylene.

---

It is known to polymerize ethylene, at selected conditions, and in the presence of catalytic mixtures consisting of transition metal halides and halogenated aluminum alkyl compounds to yield various products, generally high molecular weight polymers. Low molecular weight compounds, however, have also been prepared. In, e.g., U.S. 2,993,942, products of molecular weight ranging from about 80 to about 2000 have been prepared, these being suitable as lubricating oils. In the disclosed process increased oil yields, catalytic reactivity and improved molecular weight control can be obtained by the addition to the reaction system of minor amounts of low molecular weight alkanols, these acting as catalyst modifiers. Both the modified and unmodified systems result, under the conditions of reaction, in the production of major portions of olefins other than linear alpha olefin products, viz, Type 2 (RCH=CHR), Type 3 ($R_2C=CH_2$), and Type 4 ($R_2C=CHR$) olefins.

In accordance with the present invention, ethylene can be selectively polymerized under controlled conditions to produce high concentrations of low molecular weight Type 1 olefins, i.e., linear alpha olefins. A key and novel feature of the invention is that an ethylene oligomerization reaction is conducted by modification of a catalytic mixture of a transition metal halide and alkyl aluminum halide with an organic phosphite or phosphine compound, added to or incorporated in certain critical concentrations within the catalytic mixture prior to or at the very moment the catalytic components are brought together. The modifier is added in molar concentration ranging from about 5 percent to about 50 percent, and preferably from about 10 percent to about 20 percent, based on the moles of transition metal halide present in the catalytic mixture. Both the addition of the modifier ab initio to the mixture, and the prescribed concentrations therein, are critical inasmuch as post addition has been found detrimental or, at least, ineffective for modification, and high concentrations suppress oligomer yields.

It has thus been found that the selectivity of the catalytic mixture in forming oligomers, as opposed to high molecular weight, xylene insoluble polyethylene, is enhanced by modification with an organic phosphine or phosphite compound, preferably one corresponding to the formula YY'Y"P wherein P is phosphorus and Y, Y' and Y" are the same or different groups, substituents or radicals selected from hydrogen, alkyl, cycloalkyl and alkoxy. At least one of the substituents Y, Y' and Y" is alkyl, cycloalkyl or alkoxy. The alkyl, cycloalkyl and alkoxy groups can contain from 1 to about 20 carbon atoms, but preferably contain from about 2 to about 8 carbon atoms. The tertiary phosphine and phosphite compounds are the most preferred as, inter alia, they are the most reactive and produce the greatest benefits from a cost-effectiveness standpoint. The trialkyl phosphines are the most preferred compounds and, in general, produce greater yields of the linear alpha olefins.

Exemplary of such compounds are ethyl phosphine, butyl phosphine, diamyl phosphine, dioctyl phosphine, triethyl phosphine, tributyl phosphine, trioctyl phosphine, tridodecyl phosphine, octyl didodecyl phosphine, trinonadecyl phosphone, n-propyl phosphite, triethyl phosphite, trioctyl phosphite, tridodecyl phosphite, trioctadecyl phosphite and the like.

In forming the catalytic complex, either the transition metal halide or the alkyl aluminum halide is first modified by addition of the phosphine or phosphite compound and then added together in such proportions, and for sufficient times, that the transition metal retains its 4+ valence, no part of the compound being significantly reduced. In such pretreatment the catalyst components (transition metal halide and the alkyl aluminum halide) are added together under conditions which maximize catalyst activity and minimize reduction of the transition metal halide. Typical catalyst pretreatment conditions include the formation of transition metal halide concentrations ranging from about 0.002 Molar to about 0.5 Molar, and preferably from about 0.005 Molar to about 0.01 Molar, based on the weight of the solvent. The treatments are carried out at times ranging from about 2 to about 120 minutes, and preferably from about 15 to about 45 minutes. Temperatures range from about 0° C. to about 30° C., and preferably from about 10 to about 20° C. These conditions of pretreatment significantly affect catalyst activity and the average molecular weight of oligomer produced, and hence are to be observed in formation of the catalyst.

The linearity and molecular weight, as well as the yield, of the oligomers is influenced by use of the phosphine or phosphite modifier. The modifier causes an increase in the linearity and molecular weight of the oligomers. The molecular weight is increased even though the normal overall product distribution of oligomers does not significantly change from that which would be obtained from an unmodified catalytic complex.

For example, the addition of the catalyst modifier shifts the number average molecular weight of the oligomer product from about 114 to about 125, thus increasing the yield of oligomers in the range desirable for detergents. It is also possible by addition of modifiers to increase the number average molecular weight to about 150, thus substantially increasing the yield of oligomers of interest as waxes, wax modifiers and oil soluble detergents. Hence, the present invention is highly regarded as a convenient method of increasing molecular weight.

The catalyst employed in the reaction system is a complex reaction product having a formula $AlR_nX_{3-n}$ which is substantially soluble in the polymerization system. The complex is obtained by partially reacting a reducible, heavy transition metal halide, the metallic portion of which is selected from Groups IV–B, VI–B, and VIII, of the Periodic Chart of the Elements, with an aluminum alkyl halide compound to produce the catalyst complex $AlR_nX_{3-n}$, wherein $n$ is less than 2, R is alkyl, cycloalkyl or aralkyl, preferably containing from 1 to about 20 carbon atoms, for example, methyl, ethyl, isobutyl, cyclohexyl, benzyl, etc., and X is chlorine, bromine or iodine. The preferred transition metal used in forming the complex is a titanium compound having a valency of 4, as represented by the formula: $TiX_aA_b$, wherein $a=3$ or 4, $b=0$ or 1 and $a+B=4$, X=chlorine or bromine and A is chlorine, bromine or an anion derived from a protonic compound such as an alcohol (R'OH) or a carboxylic acid (R'COOH). The R' of the protonic compound can be an alkyl, allyl, aryl, aralkyl or cycloalkyl group. The $TiX_aA_b$ component can be made in situ by reacting $TiX_4$, with the protonic compound. Thus the preferred transition metal component of this invention may be selected from the groups $TiX_4$, $TiX_3OR'$ and $TiX_3OOCR'$. Typical examples of such compounds are $TiCl_4$, $TiBr_4$, $TiX_3OC_2H_5$ and $TiX_3OOCCH_3$.

The aluminum alkyl halide component is generally of the formula $R_1R_2AlX$ wherein $R_1$ and $R_2$ are similar or dissimilar and thus represent a hydrocarbon radical such as alkyl, cycloalkyl or aralkyl containing, preferably, from 1 to about 20 carbon atoms, and X is a halogen such as chlorine, bromine or iodine.

The molar ratio of alkyl aluminum halide to the transition metal halide in forming the complex is not critical to this invention as long as the $AlR_nX_{3-n}$ reaction product has the proper formula. The ratio can be 0.1/1 to 150/1 or more. Catalyst concentration is normally in the range of 0.1 to 10 grams per liter of diluent.

Ethylene is unique in the instant invention in that other olefins do not respond to give linear alpha olefins. Therefore, it is desirable to use essentially pure ethylene or mixtures of ethylene with inert gases as the feed for the process of this invention. Ethylene feeds containing minor amounts of other olefins can be used but it must be realized that the copolymerization will to some extent decrease product linearity. Generally, product linearity should not be permitted to decrease below about 90 percent.

The polymerization diluent is a critical feature of this invention. Polar diluents are essential, but polar aromatic hydrocarbon and halohydrocarbon solvents are especially preferred. Aliphatic and naphthenic diluents are completely unsatisfactory when used alone since they produce only high molecular weight, solid polyethylene. The preferred diluents are aromatic and halogenated aromatic solvents because their use results in the production of linear alpha-olefins in the desired molecular weight range while employing the most efficient temperatures and ethylene pressures. Less preferred solvents are halogenated aliphatic compounds which, though capable of being employed in the process of preparing linear alpha olefins, require the utilization of higher pressures to achieve average molecular weights of the same order as the preferred solvents. The preferred diluents include halogenated aromatics such as chlorobenzene, dichlorobenzene, chlorotoluene, and the like, and aromatics such as benzene, toluene, xylene, tetrahydronaphthalene, and the like. The less desirable halogenated aliphatic diluents include methyl chloride, ethyl chloride, dichloromethane, and the like. Mixtures of these and other diluents can be used. Even mixtures of the above types with, e.g., aliphatic or naphthenic solvents, can be used provided the polar types comprise a minimum of about 40 percent, based on the weight of the total solvent. The diluent or diluent mixture can be used to control the product molecular weight distribution to obtain maximum selectivity to the desired olefin products.

The reaction must be conducted at sufficient pressure to avoid the formation of highly branched olefins and to obtain linear olefins in high selectivities. Although some variations in pressure are permitted, depending upon the catalyst composition, diluent and temperature, the pressure should be maintained above about 100 p.s.i.g. in order to produce commercially attractive yields (at least above 5 weight percent and preferably above 10 weight percent olefins in the reactor effluent) of linear alpha olefins having a purity greater than about 90 percent. Pressures can range as high as 1000 p.s.i.g., and higher, but at very high ethylene pressures the process may become uneconomical because of the equipment requirements and ethylene recycle. Preferably, the pressure ranges from about 200 p.s.i.g. to about 600 p.s.i.g. of ethylene pressure.

The ratio of moles of ethylene to the moles of products must be above about 0.8 in order to effect the selective synthesis of ethylene to linear olefins. The preferred molar ratio of ethylene to products is above about 2.0. The upper limit of the mole ratio of ethylene to product must be above 0.8 or the product formed contains more than 10 percent branched chain olefins at product concentrations required to obtain commercially attractive yields.

The process of this invention is carried out at selected conditions of temperature and pressure which will maintain the ethylene or liquid phase. Preferably, the reaction can be carried out at temperatures below about $+75°$ C., but more preferably it is carried out at between about $-30°$ C. and about $+50°$ C. The selection of a particular temperature will permit control of the average number molecular weight of the product.

Reaction times are not particularly critical when operating under the preferred conditions and they will normally be in the range of 0.1 to 5 hours to obtain product concentrations greater than 5 percent by weight in the diluent. The process can be carried out in batch or continuous operation. However, high product purity and high concentration are achieved most easily in batch reactions or in continuous systems operating under essentially plug flow.

The oligomerization reaction is not generally carried to completion, but quenched to terminate the reaction at an optimum desired time. After the catalyst has been effectively quenched, e.g., by adding isopropyl alcohol, the residues can be removed from the products in any conventional way, such as washing with water or aqueous caustic, adsorption, ion exchange resins, and the like.

The following demonstration, and illustrative examples, bring out the more salient features of the invention.

The following demonstration is illustrative of the experimental procedure used in carrying out ethylene oligomerization without use of a modifier.

CATALYST PREPARATION

Approximately 400 grams of xylene (percolated over alumina and stored over sodium ribbon) was charged to a dry 500 ml. flask equipped with a small side arm, a serum cap, and an adapter to permit charging to an autoclave. Forty-four hundredths ml. of $TiCl_4$ (4 millimoles) were injected into the xylene solvent.

The flask containing the $TiCl_4$-xylene solution was then wrapped in aluminum foil, and the contents cooled to 15° C. by immersion of the flask into a stirred ice-water bath. Then 3.4 ml. of a 20 percent aluminum alkyl mixture in xylene (4 millimoles of aluminum ethyl dichloride and 2 millimoles of aluminum diethyl chloride) were injected into the $TiCl_4$-xylene solution. The resulting solution was stirred for 30 minutes at 15° C.±1° C. The flask was then removed from the ice-water bath, weighed and the contents thereof pressured into a 2-liter Parr autoclave.

Weighing the catalyst flask after charging permitted an accurate determination of the weight of catalyst solution charged to the autoclave. Four hundred and nineteen grams of the catalyst, clear and red-orange in color, was charged to the autoclave.

OLIGOMERIZATION

The oligomerization reaction was carried out in a 2-liter Parr autoclave. The contents of the autoclave were pre-cooled to −25° C. prior to charging the catalyst solution. After the catalyst was added, ethylene (dry and oxygen-free) was pressured into the autoclave. The pressure in the autoclave was maintained at 500 lbs. by adding ethylene as needed. The temperature rose quite rapidly to around 0° C. and was maintained at ±2° C. for one hour.

The run was terminated by pressuring in 14.4 grams of isopropanol while the reactor was still under reaction conditions (+2° C., 500 p.s.i.g. ethylene pressure). The quenched product was stirred for approximately 5 minutes and the unreacted ethylene vented off through a Dry Ice trap and wet test meter. After all the ethylene had been vented, the autoclave was weighed prior to disassembly to obtain a yield figure. The autoclave was then disassembled and the total product removed. A sample of the product was analyzed on a G.C. column to obtain a yield figure and product distribution data. The yield of liquid olefins was 199 grams or 32.4% (bomb balance). The olefin concentration in xylene was found to be 33.9%.

PRODUCT WORKUP

The alcohol quenched product was water-washed using two 500 ml. portions of deionized water. After separating off the water, the amount of xylene insolubles was determined by filtration, air drying and finally drying for 1 hour in a vacuum oven at 125° C. and 26″ Hg vacuum. The yield of xylene insolubles was found to be 1.4 grams or 0.7 percent, based on the weight of olefins. (Xylene insolubles using unmodified catalyst, under generally similar conditions, has been found to vary as high as 2.0 weight percent, or more.) The filtered liquid product (xylene plus ethylene oligomers) was dried and analyzed using capillary G.C. techniques. Product linearity (weight percent linear alpha olefins in $C_{12}$–$C_{20}$ fraction) was found to be 97.5. The average molecular weight of the olefins was determined as 117.

The following examples, selected to show the benefits of adding a modifier, are to be contrasted with the above demonstration.

Example I

This run was conducted exactly as the foregoing with the exception that 10 mole percent of trioctyl phosphine (0.4 mole based on $TiCl_4$) was added to the xylene prior to injecting the titanium tetrachloride. Olefin yield after one hour was 162 grams, and the amount of xylene insolubles was 0.6 gram (0.37 weight percent, based on total olefins). The xylene insolubles in this instance were waxy in nature and not high molecular weight polyethylene as obtained in the foregoing. Average molecular weight of the olefins was 120 and linearity (weight percent linear alpha olefins in $C_{12}$–$C_{20}$ fraction) was 98.1 percent.

Example II

Example I was again repeated except that 20 mole percent trioctyl phosphine based on $TiCl_4$ in catalyst mixture was added to the xylene prior to injecting the $TiCl_4$. The reaction time was increased from 1 to 2 hours. The results: Olefin yield=144 grams, average mol wt. 136, and the linearity of ($C_{12}$–$C_{20}$) product 98 percent. Xylene insolubles were 0.2 gram (0.14 weight percent on olefins) and waxy in nature.

Example III

Example I was again repeated except that 10 mole percent based on $TiCl_4$ of tributyl phosphine was added to the xylene prior to injection of the titanium tetrachloride. The results: Olefin yield=294 grams with an average molecular weight of 125 and a linear alpha olefin content of 97.4 percent for the $C_{12}$–$C_{20}$ fraction. Xylene insolubles were 0.5 gram or approximately 0.2 weight percent based on olefins and these were waxy in nature.

In sharp contrast, running an unmodified catalyst to a comparable conversion level gave a linearity of 94.8 percent for the $C_{12}$–$C_{20}$ fraction.

Example IV

Example I was again repeated except that 20 mole percent based on $TiCl_4$ of triethyl phosphite was added. After one hour reaction time, the olefin concentration was 25 weight percent with 0.7 weight percent on olefins of xylene insolubles. The $C_{12}$–$C_{20}$ fraction was 98.1 percent linear alpha olefins.

These examples thus show that with phosphine or phosphite modification, the loss in selectivity to the desired Type-I olefins normally experienced at high ethylene conversion is significantly reduced.

The modified catalyst provides a means of controlling the product's average molecular weight and is preferred over existing methods of altering product characteristics, e.g., temperature change, change in diluent polarity, pressure change, variation of catalyst pretreatment conditions, or change in the catalyst Al:Transition metal ratios.

Having described the invention, what is claimed is:

1. In a process for preparing linear alpha olefins having an average molecular weight ranging from about 70 to about 300 by polymerizing ethylene in the presence of a catalyst formed on reacting a titanium halide selected from the group consisting of $TiX_4$, $TiX_3OR'$, $TiX_3OOCR'$, wherein X is selected from the group consisting of chlorine and bromine and R' is selected from the group consisting of alkyl, allyl, aryl, aralkyl and cycloalkyl with an aluminum alkyl halide compound such that the ultimate formula of the aluminum alkyl compound is $AlR_nX_{3-n}$, wherein R is selected from the group consisting of alkyl, aralkyl and cycloalkyl, X is selected from the group consisting of chlorine, bromine and iodine, and $n$ is less than 2, said reaction taking place in the presence of a modifier characterized by the formula YY'Y″P wherein P is phosphorus and Y and Y' and Y″ are substituents wherein Y is one selected from the group consisting of alkyl, cycloalkyl and alkoxy, wherein Y' and Y″ are each selected from the group consisting of hydrogen, alkyl, cycloalkyl and alkoxy, said modifier being present in an amount ranging from 5 to 50 mol percent based upon the moles of titanium halide present in the catalytic mixture, said titanium halide and said aluminum alkyl halide being brought together under such conditions to prevent the reduction of the titanium halide, said polymerizing step taking place in the presence of a polar diluent, said diluent being one selected from the group consisting of aromatic, halogenated aromatic and halogenated aliphatic compounds at temperatures below 50° C. and under pressures sufficient to liquefy the ethylene.

2. The process as in claim 1 wherein said modifier is added in concentrations ranging from about 10 percent to about 20 percent.

3. The process of claim 1 wherein Y, Y' and Y″ substituents contain from 2 to 8 carbon atoms.

4. The process of claim 1 wherein the catalytic mixture is formed on reacting titanium tetrachloride, with alkyl aluminum chloride in the presence of a phosphine modifier selected from the group consisting of tributyl phosphine and trioctyl phosphine wherein said titanium tetrachloride and alkyl aluminum chloride are brought together under such conditions to prevent the reduction of the titanium tetrachloride.

5. The process of claim 1 wherein the polymerization is reaction conducted at temperatures ranging from about −30° C. to about +50° C., and at pressures ranging from above about 100 p.s.i.g. to about 1000 p.s.i.g.

6. The process of claim 5 wherein the polymerization pressures range from about 200 p.s.i.g. to about 600 p.s.i.g.

7. A process according to claim 1 wherein the polar diluent is selected from the group consisting of chlorobenzene, dichlorobenzene, chlorotoluene, benzene, toluene, xylene, tetrahydronaphthalene, methylchloride, ethylchloride and dichloromethane.

References Cited
UNITED STATES PATENTS

| | | | |
|---|---|---|---|
| 2,993,942 | 7/1961 | White et al. | 260—683.15(D) |
| 3,081,287 | 3/1963 | Coover et al. | 260—93.7 |

PAUL M. COUGHLAN, JR., Primary Examiner

U.S. Cl. X.R.

252—429; 260—94.9